(12) United States Patent
Vahid

(10) Patent No.: US 9,072,348 B2
(45) Date of Patent: Jul. 7, 2015

(54) VIDEO ADAPTABLE JEWELRY

(71) Applicant: Javid Vahid, Dana Point, CA (US)

(72) Inventor: Javid Vahid, Dana Point, CA (US)

( * ) Notice: Subject to any disclaimer, the term of this patent is extended or adjusted under 35 U.S.C. 154(b) by 232 days.

(21) Appl. No.: 13/679,813

(22) Filed: Nov. 16, 2012

(65) Prior Publication Data
US 2013/0074543 A1 Mar. 28, 2013

(51) Int. Cl.
*G09G 5/00* (2006.01)
*F21V 33/00* (2006.01)
*A44C 15/00* (2006.01)

(52) U.S. Cl.
CPC ............. *A44C 15/00* (2013.01); *A44C 15/0015* (2013.01)

(58) Field of Classification Search
CPC ........ G09G 5/00; F21V 33/00; F21V 33/0004
USPC .............................. 63/1.11, 1.13, 15; 362/104
See application file for complete search history.

(56) References Cited

U.S. PATENT DOCUMENTS

| | | | |
|---|---|---|---|
| 6,216,490 B1 * | 4/2001 | Radley-Smith | 63/3 |
| 6,611,244 B1 | 8/2003 | Guritz | |
| 7,460,085 B2 * | 12/2008 | Ishii | 345/1.1 |
| 2005/0127866 A1 | 6/2005 | Hamilton | |
| 2008/0018556 A1 | 1/2008 | Gregory | |

FOREIGN PATENT DOCUMENTS

WO 2011046976 4/2011

OTHER PUBLICATIONS

Rospatent, International Search Report and Written Opinion, issued in corresponding PCT application; mailed on Apr. 3, 2014.

* cited by examiner

*Primary Examiner* — Jack W Lavinder
(74) *Attorney, Agent, or Firm* — CIONCA Law Group P.C.; Marin Cionca

(57) ABSTRACT

A jewelry piece in which the precious stone is replaced with an apparatus comprising a screen, wherein the apparatus is capable of receiving from a smart phone and displaying on the screen an image a user selects from a plurality of choices, in order to make the jewelry piece appear as having a particular precious stone.

9 Claims, 5 Drawing Sheets

VIDEO ADAPTABLE JEWELRY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The invention relates generally to jewelry and more particularly to a method and system for custom-changing the appearance of the "precious stone" element of a jewelry piece.

2. Description of the Related Art

Typically, one person's wardrobe, especially that of a woman, includes a variety of clothing articles of different styles and colors to be worn as appropriate for the season, time of day, event attended, and so on. Wearing a particular clothing article, such as a dress having a certain color, typically requires matching jewelry pieces. Thus, many jewelry pieces are needed if a matching style is always desired.

Purchasing various pieces of jewelry having precious stone elements to match for example the various colors in one's wardrobe can be very expensive, even if such stone elements are artificial. This is because, currently, the jewelries available on the market are rigid in design and cannot adapt to the customers' various needs. Namely, the available jewelries do not give the flexibility to the customer to custom-change the look of their jewelries to match the outfit, its color, or the style of their preference.

Thus, there is a need for a new kind of jewelry that addresses the problems described above.

BRIEF SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one exemplary embodiment, the precious stone element of a jewelry piece is replaced with a flexible screen and the jewelry piece is adapted to be capable of receiving from a smart phone and displaying on the flexible screen an image a user selects in order to make the jewelry piece appear as having a particular precious stone. Thus, an advantage is that the user can customize the appearance of the jewelry piece as needed in order to match a certain style or color of an outfit. Another advantage is that the user can save a significant amount of money by only purchasing a few of such customizable jewelry pieces and still preserving the ability to match a potentially unlimited number of styles and colors, by simply changing the image or pattern displayed by the flexible screen.

In another exemplary embodiment, the assembly that includes the flexible screen and the supporting components and circuitries can easily and quickly be moved from one jewelry piece to another. Thus, another advantage is that a number of such assemblies, which is less than the total number of user's jewelry pieces, need to be purchased by the user, thus, further saving money to the user.

In another exemplary embodiment, images and patterns may be easily and conveniently transferred from one jewelry piece to another by simply tapping the two jewelry pieces onto each other. Thus, another advantage is that the user may install a preferred image into a ring for example and then simply tap all the other jewelry pieces the user wants to wear at one time (e.g., bracelet, earrings, etc), in order to make them all match.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, embodiments of the invention are illustrated in the figures of the accompanying drawings, in which.

DETAILED DESCRIPTION OF THE PREFERRED EMBODIMENTS

Figure 1:
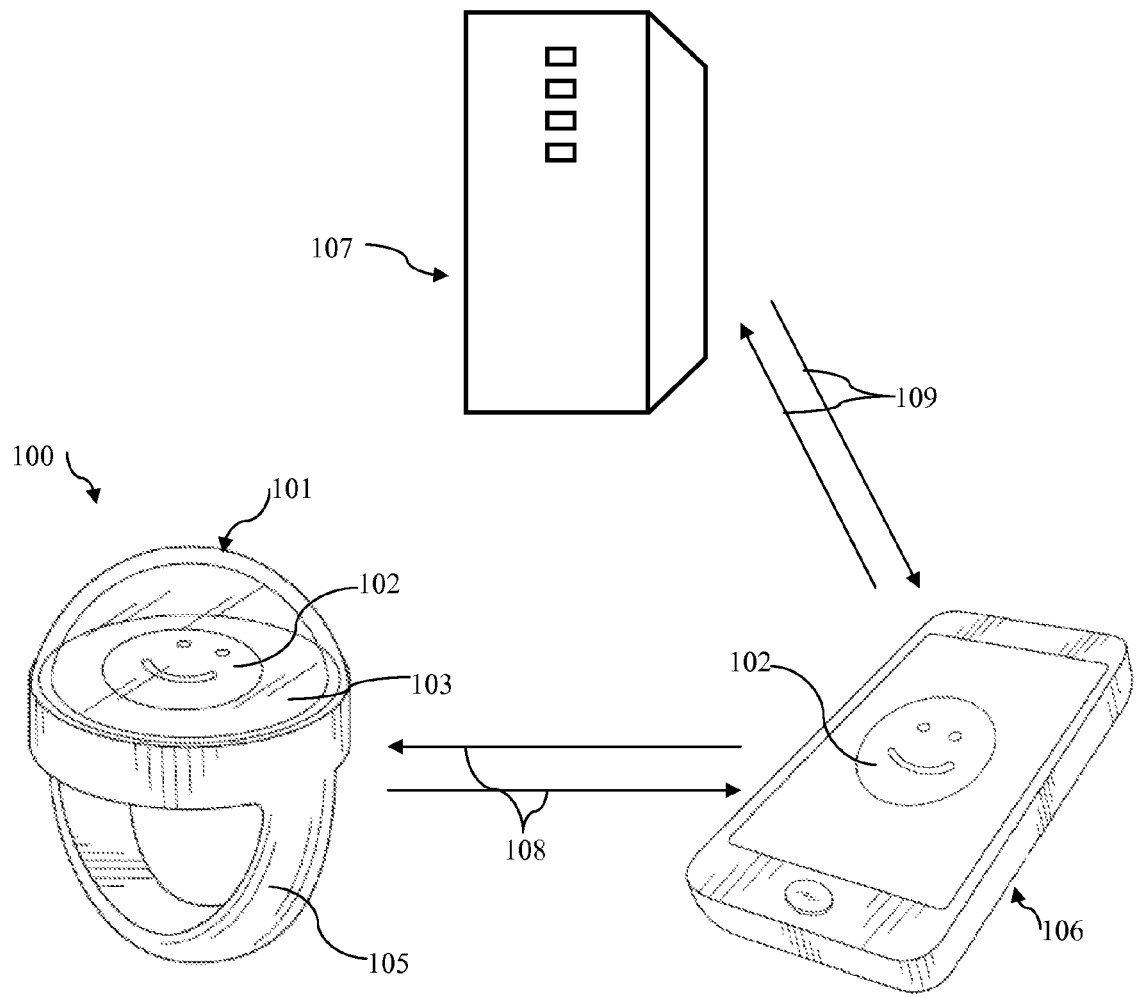
FIG. 1 illustrates a schematic view of a system for creating a video adaptable jewelry, according to an embodiment.

What follows is a detailed description of the preferred embodiments of the invention in which the invention may be practiced. Reference will be made to the attached drawings, and the information included in the drawings is part of this detailed description. The specific preferred embodiments of the invention, which will be described herein, are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

The terms video adaptable jewelry, adaptable jewelry, customizable jewelry, jewelry and their derivatives are used interchangeably within this specification.

FIG. 1 illustrates a schematic view of a system for creating a video adaptable jewelry, according to an embodiment. As shown, a piece of jewelry 100, such as a ring, may be adapted to receive an image 102 from a smart phone 106. The image 102 may be a still image or a video. The adaptable jewelry 100 may typically have a metal (e.g., gold, silver, and so on) portion 105 and a dome 101. In a less expensive embodiment, the dome 101 may be a transparent lens, which may be solid or hollow, while the image 102 is displayed as shown on a flat screen 103 having substantially the same area as the base of the dome 101 and the top surface of metal portion 105. Thus, for example, the image 102 may be a blue layer displayed on the entire flat screen 103 from where the image 102 reflects onto the transparent lens, thus making the lens appear blue, thus imitating a blue sapphire for example. Hence, the user/wearer of the adaptable ring 100 has now a ring which appears to have a sapphire stone to match other of her accessories or clothing article(s). Should the user want to change the ring to appear as having a green topaz instead of blue sapphire, she will simply replace the blue image 102 with a green image matching the color of a green topaz. Thus, the user has an unlimited number of possibilities to use the same piece of jewelry while appearing to have a different precious stone.

In a preferred embodiment, instead of using the flat screen 103, a flexible screen (not shown) may be installed on dome 101 such that the flexible screen takes the shape of the dome. It should be noted that if the flexible screen is installed on the exterior surface of the dome 101, the dome does not need to be transparent. In an even more preferred embodiment, the flexible screen may completely replace the dome 101, thus, actually becoming the dome 101, such that adaptable jewelry 100 may include the metal portion 105 and a flexible screen having the shape of a dome or any other desired shape (e.g., more sophisticated, faceted shapes). The flexible screen may be a OLED (organic light-emitting diode) flexible screen or any other type of flexible screen available and suitable for this kind of small and flexible display application.

The images 102 and different patterns may be created for example by users or by a third party and they may be typically stored on a server 107 from where they may be downloaded via a two-way internet or cellular network link 109 into a smart phone 106. The smart phone 106 will be equipped with an application ("app") specifically configured to perform all the functions described in this disclosure, including, preferably, a software for images or pattern development by the user to download into the jewelry. The adaptable jewelry app may also be stored on server 107 and may be made available for download onto the smart phone 106. Through the adaptable jewelry app, the images may be downloaded from the server 107 and then, typically using a two-way communication link 108 employing technologies such as Bluetooth, uploaded from the smart phone 106 into the adaptable jewelry 100. The adaptable jewelry 100 may be configured to receive/download and store the image 102, as it will be described in more details later herein, and display the image 102 as explained earlier. Thus, again, the appearance of the adaptable jewelry 100 may change at any time based on the image 102 downloaded from the smart phone 106.

It should be noted that other technologies now known or future developed may be used to customize a jewelry piece, to obtain the effect described above, without departing from the scope of the invention. For example, once the hologram technology advances in the future, the dome and the display may be replaced with a hologram graphic imitating a precious stone. Furthermore, future technological advances may make it possible for the adaptable jewelry 100 to communicate directly with server 107, thus eliminating the need of a smart phone 106 to complete the process described herein.

Figure 2:
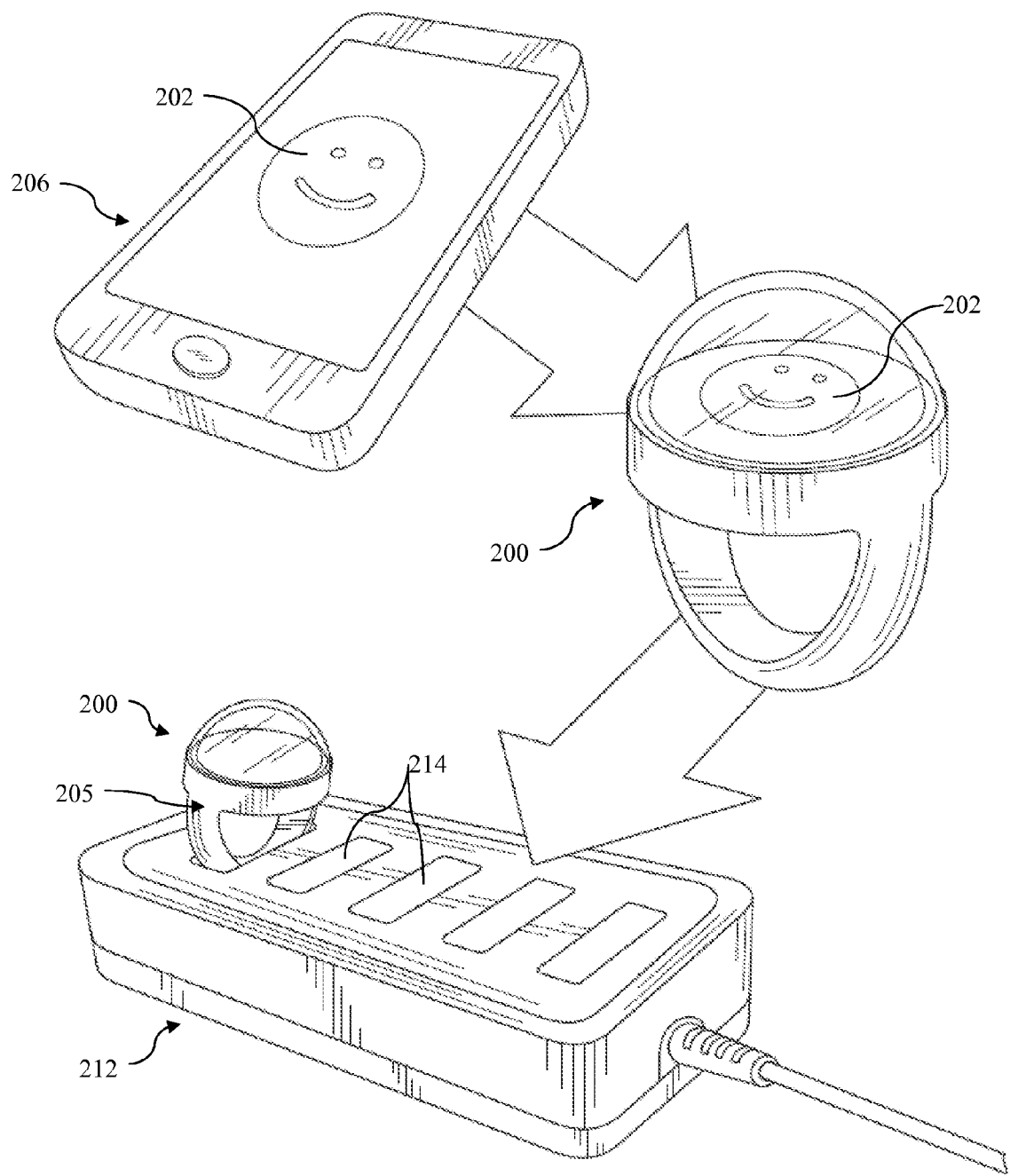
FIG. 2 illustrates a schematic view of a system for using and maintaining a video adaptable jewelry, according to another embodiment.

FIG. 2 illustrates a schematic view of a system for using and maintaining a video adaptable jewelry, according to another embodiment. As explained earlier, images 202, graphics, colors, patterns and/or information from a smart phone 206 may be uploaded into and displayed by an adaptable jewelry 200 in order to customize its appearance. The functional components described in detail later herein of the adaptable jewelry are typically powered by a battery, which preferably last a few hours depending primarily on the size of the image or video being displayed. A few hours of lasting power supply would typically be sufficient for the user of the adaptable jewelry to attend events such as a reception. Before and/or after use of the adaptable jewelry 200, its battery may be charged by simply placing the adaptable jewelry 200 in one of the slots 214 of a charger 212, which in turn may be connected to a standard house or car outlet (not shown). It should be noted that the charger 212 may have several slots 214 to accommodate simultaneously several adaptable pieces of jewelry 200 (e.g., a ring, earrings, a pendant of a necklace, etc) a user may have and want to charge and use. As one of ordinary skills in the art would recognize, the charger 212 may be an induction charger in which power is transferred to the metal portion 205 of the adaptable jewelry 200, and then to the battery, through the plastic case of the charger 212 and/or its slots 214 using magnetic induction, thus, without the need for metal contact(s).

In another embodiment, the charger may simply be an inductive charging tray (not shown), or a bowl, or other similarly shaped container or platform, which may be plugged into a standard wall outlet, and on which the user basically may throw her ring, bracelet, etc, for charging purpose. Once the jewelry sits on the tray, through magnetic induction, the battery in that jewelry is charged. This approach may be more convenient for the user, and even a fun thing to do.

Figure 3:
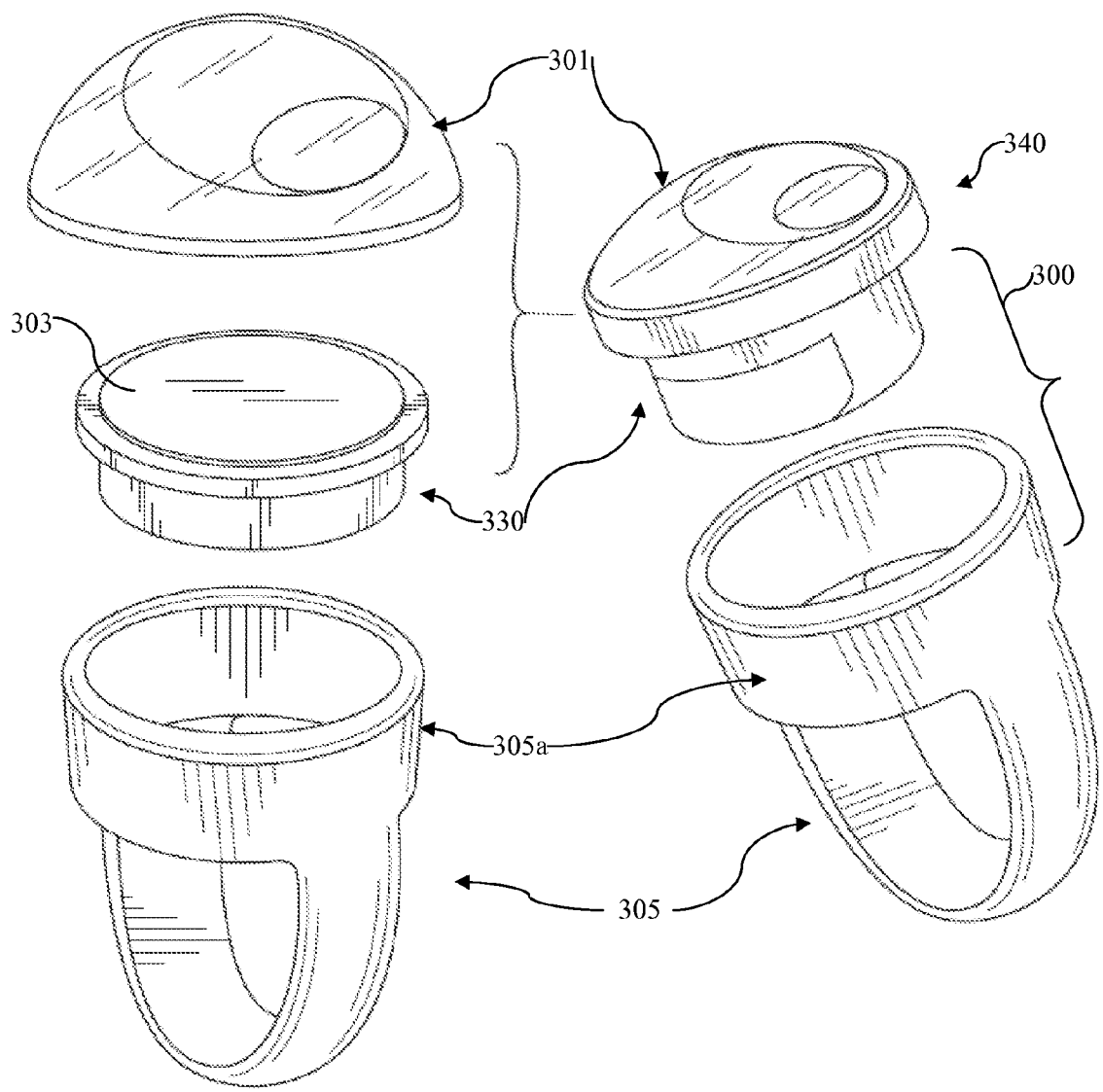
FIG. 3 illustrates exploded perspective views of the adaptable jewelry 100 from FIG. 1.

FIG. 3 illustrates exploded perspective views of the adaptable jewelry 100 from FIG. 1. As shown, the dome 301 may be associated with a housing member 330 forming together the dome assembly 340. The dome 301 and the housing member 330 may be associated together using known fastening methods such as snap or thread-based fastening. The housing member 330 may further be associated with the base 305*a* of the metal portion 305 of the adaptable jewelry 300. Thus, together, the dome assembly 340 and the metal portion 305 form the adaptable jewelry 300 (100 in FIG. 1). The dome assembly 340 may also be associated with the base 305*a* of metal portion 305 through known fastening methods such as snap or thread-based fastening. When snap fastening is used, the dome assembly 340 may be easily popped up from the bottom of base 305*a*, when, for example, the dome assembly 340 needs to be replaced with another one, or when the dome assembly is needed for use with another jewelry.

It should be noted that at the top of the housing member 330, a flat screen 303 may be placed, as described above as being the case of one, less expensive, embodiment. As explained earlier, the preferred embodiments are using flexible screen on (i.e., on top of or under) the dome 301 or the dome is actually the flexible screen shaped as a dome or in any other desired shape.

The housing member 330 houses important circuitries and components, which one of ordinary skills in the art would recognize, are necessary to accomplish the customizing functionality of the appearance of dome 301, and thus, of the entire adaptable jewelry 300, as described earlier. Such circuitries and components include: miniature electronic circuitry for the screen 303; miniature electronic circuitry, including an antenna, to enable the communication link 108 (FIG. 1) between the smart phone 106 (FIG. 1) and the adaptable jewelry 300 (100 in FIG. 1), as described earlier when referring to FIG. 1 (e.g., using Bluetooth technology); memory circuitry to store the image, video or other data transferred to the adaptable jewelry; a microprocessor chip and program(s) needed to perform all adaptable jewelry's functions as described herein; and, a battery to supply power to all circuitry and components in need of power.

One of ordinary skills in the art would recognize that different approaches may be adopted in regards to where and how to actually equip the adaptable jewelry with the above listed components and circuitries. An approach or another may be selected based on various factors such as the impact on jewelry's appearance, reliability and costs. For example, the metal portion 305 (105 in FIG. 1) may itself possibly be used as an antenna. Or, as another example, the antenna may be integrated discretely in the dome 301 (101 in FIG. 1), such as in a car's windshield.

Figure 4:
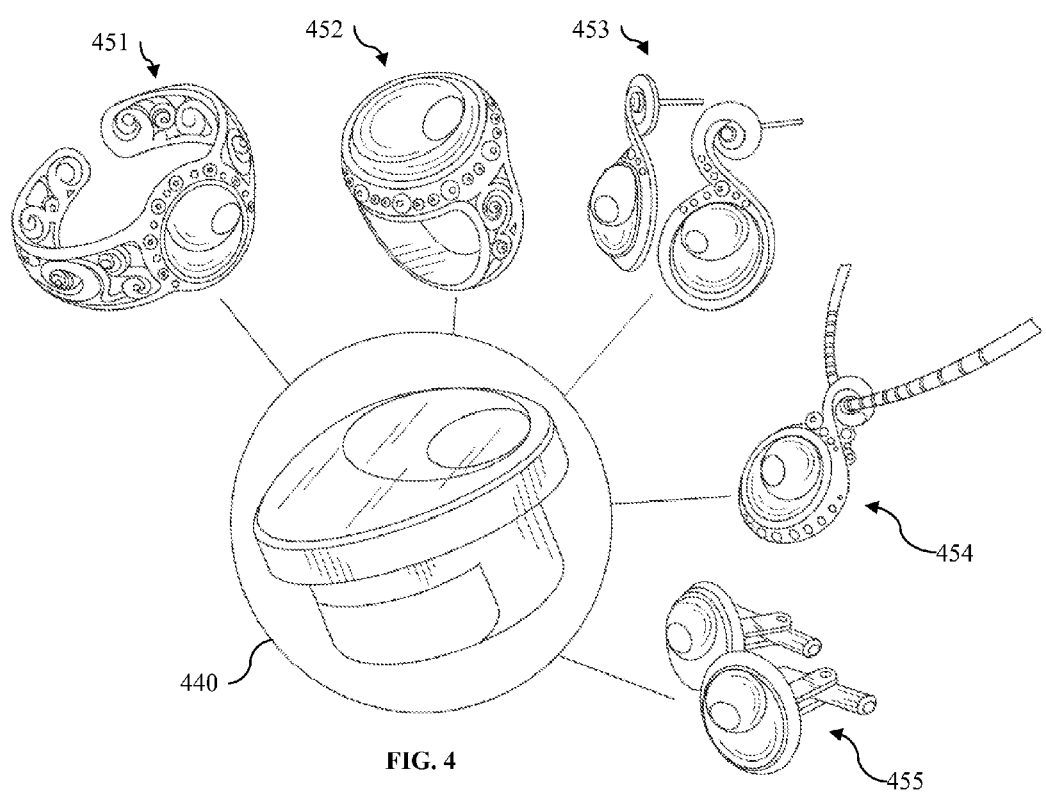
FIG. 4 depicts the interchangeability of the dome assembly 440 among various jewelry items, according to another embodiment.

FIG. 4 depicts the interchangeability of the dome assembly 440 among various jewelry items, according to another embodiment. As mentioned earlier, the dome assembly 440 may be removably associated, such as by snap fastening, with the base 305a (FIG. 3) of the metal portion 305 (FIG. 3) of the adaptable jewelry 300 (FIG. 3). This advantageous configuration allows a user to use the same dome assembly 440 on various pieces of jewelry, such as a bracelet 451, a ring 452, an earring 453, a pendant 454 of a necklace, a cuff link 455, and so on. Thus, for example, a user has the option to acquire a set of five different adaptable jewelries, such as the ones depicted in FIG. 4, and only two or three dome assemblies 440 to use as needed on the pieces of jewelry the user wants to wear on a certain occasion. As another example, a user may acquire a set of, for example, five pieces of jewelry, each having its own dome assembly 440, and also a spare dome assembly to be used in the event that one of the five dome assemblies goes dark and/or becomes defective.

Figure 5A:
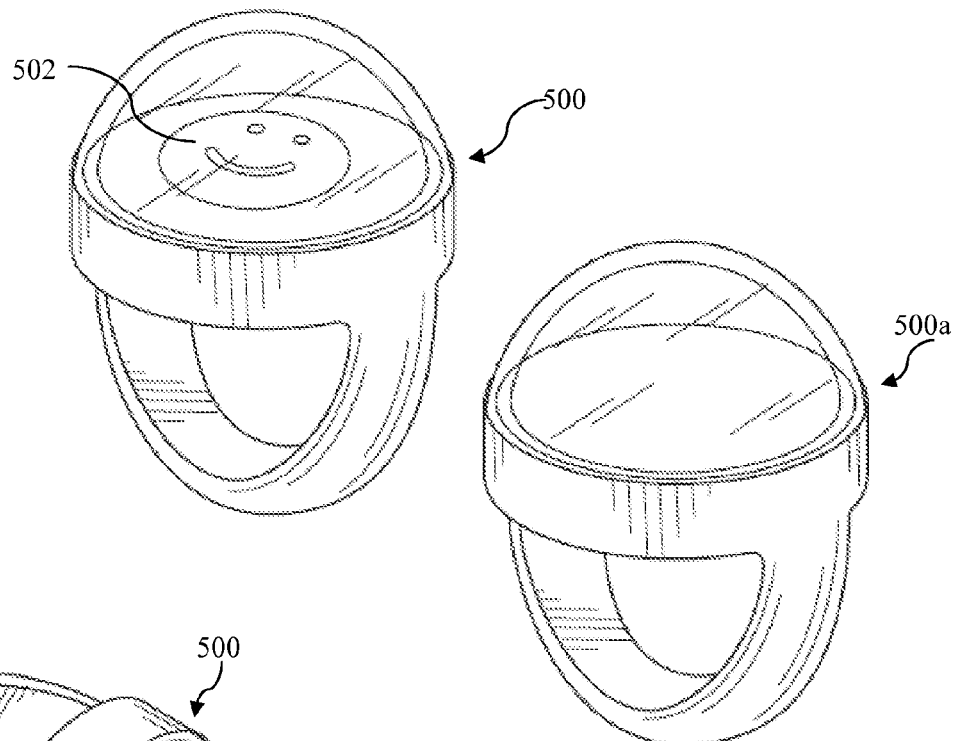
FIGS. 5a-b illustrate a method of transferring data from one adaptable piece of jewelry to another, according to another embodiment.
Figure 5B:
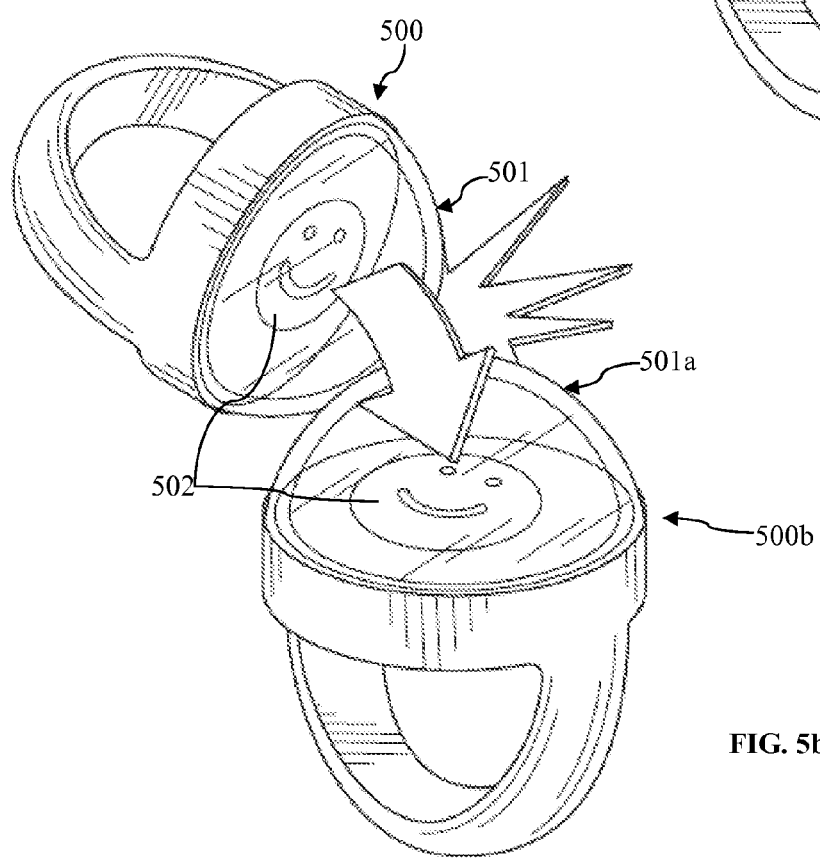

FIGS. 5a-b illustrate a method of transferring data from one adaptable piece of jewelry to another, according to another embodiment. As shown, a previously downloaded image 502 (or other data) in an adaptable ring 500 may be transferred to another adaptable ring 500a, when, for example, the 500a ring does not have the respective image (see FIG. 5a) or when synchronization of the two pieces of jewelry is desired. Such transfer may be done by simply tapping (see FIG. 5b) the domes (501 and 501a), or other portions, of the two rings (500, 500b).

To accomplish the transfer of data by tapping, known technologies in the art may be adopted, such as the bump technology used for the bumping app on current smart phones. Preferably, the tapping application will be imbedded into the processor of each ring, and configured to work with the adaptable jewelry app referred to earlier when describing FIG. 1. Once activated from their respective smart phones, the tapping application will allow the sharing of the image from one ring to the other. Therefore, there will preferably be a sync button on the smart phone adaptable jewelry app supporting the jewelry customization process disclosed herein. Once pressed, typically, the sync button will engage the embedded tapping program on the ring which will be looking for a tapping from another ring that also has the sync feature ON. Once this happens, the data between the two rings are synced.

The data transfer action between the rings may also be configured to take place from the bumping of two smart phones having the adaptable jewelry app installed. Once the two phones are bumped, the data from one phone is synced to the other and automatically downloaded to the respective rings. It should be noted that preferably no server (107 in FIG. 1) is implicated in the tapping for data transfer application. The data is preferably transferred directly between the two rings or, alternatively, between two smart phones and then to the rings.

It should be noted that the tapping or pumping actions may simply be replaced with a button on the adaptable jewelry app programmed to activate the transfer. However, the tapping or bumping of the two rings to initiate data transfer adds to the "coolness" effect of the jewelry customization process disclosed herein.

It should also be noted that, besides being "cool," the transfer by tapping described above may have significant time saving and convenience advantages. For example, the user may install, or the user may have previously installed, a preferred image into a ring, and then, the users only needs to simply and quickly tap all the other jewelry pieces the user wants to wear at one time (e.g., bracelet, earrings, etc), in order to make them all match.

One of ordinary skills in the art would recognize that the apparatus and the process disclosed herein for custom-imitating the appearance of a precious stones may be employed in other applications, other than those related to jewelry. For example, the apparatus and the process disclosed herein may be used to custom-imitate precious stones one clocks, watches, purses, shoes, furniture and so on.

One of ordinary skills in the art would also recognize that the adaptable jewelry app referred to earlier when describing FIG. 1 may incorporate other functionalities that may be useful to the user. For example, the app may be configured to monitor the battery level of the adaptable jewelry and to alert the user when the battery level is low. The alert may include the remaining time before the screen will shut down for lack of power. Thus, the user would be able to take the necessary steps to avoid an embarrassing situation when, for example, the user is at a party.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

As used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims. Use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the embodiments and examples shown should be considered as exemplars, rather than limitations on the apparatus and procedures disclosed or claimed. Although many of the examples involve specific combinations of method acts or system elements, it should be understood that those acts and those elements may be combined in other ways to accomplish the same objectives.

For means-plus-function limitations recited in the claims, the means are not intended to be limited to the means disclosed in this application for performing the recited function, but are intended to cover in scope any means, known now or later developed, for performing the recited function.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the invention. Therefore, the scope of this application is intended to cover alternate embodiments and/or equivalent variations of the specific embodiments illustrated and/or described herein. Hence, the scope of the invention is defined by the accompanying claims and their equivalents. Furthermore, each and every claim is incorporated as further disclosure into the specification and the claims are embodiment(s) of the invention.

What is claimed is:

1. A jewelry piece in which at least one stone element is replaced with an apparatus comprising a screen, wherein the apparatus is capable of receiving from a digital device and displaying on the screen digital data a user selects from a plurality of choices, in order to make the jewelry piece appear as having a preferred stone, wherein the screen is flat, and wherein the apparatus further comprises a transparent dome.

2. A jewelry piece in which at least one stone element is replaced with an apparatus comprising a screen, wherein the apparatus is capable of receiving from a digital device and displaying on the screen digital data a user selects from a plurality of choices, in order to make the jewelry piece appear as having a preferred stone, wherein the screen is flexible and shaped as a dome.

3. The jewelry piece of claim 1, wherein the digital data comprises at least one member of a group consisting of an image, a pattern and a video.

4. The jewelry piece of claim 1, wherein the digital device is a smart phone, which downloads the digital data from a server before uploading it into the apparatus.

5. The jewelry piece of claim 1, wherein the digital data comprises information about an image colored in blue such that the preferred stone imitates a sapphire.

6. The jewelry piece of claim 1, wherein the apparatus further comprises means for allowing the received digital data to be transferred to an apparatus of another jewelry piece by tapping the two jewelry pieces onto each other, such that the jewelry piece to which the digital data is transferred, after the transfer, appears as having the same preferred stone.

7. The jewelry piece of claim 1, wherein the transparent dome is faceted.

8. A jewelry piece in which at least one stone element is replaced with an apparatus comprising a screen, wherein the apparatus is capable of receiving from a digital device and displaying on the screen digital data a user selects from a plurality of choices, in order to make the jewelry piece appear as having a preferred stone, wherein the screen has the shape of the preferred stone.

9. The jewelry piece of claim 8, wherein the preferred stone has a faceted shape.

* * * * *